United States Patent [19]
Amos

[11] Patent Number: 5,804,620
[45] Date of Patent: Sep. 8, 1998

[54] EMBRITTLEMENT-RESISTANT POLYOLEFIN COMPOSITION AND FLEXIBLE ARTICLES THEREFROM

[75] Inventor: Stephen E. Amos, Minneapolis, Minn.

[73] Assignee: Montell North America Inc., Wilmington, Del.

[21] Appl. No.: 665,784

[22] Filed: Jun. 18, 1996

[51] Int. Cl.$^6$ .................................................. C08L 83/08
[52] U.S. Cl. .................. 524/99; 524/267; 524/432; 524/433; 524/444; 524/451; 515/106; 515/102
[58] Field of Search .................................. 525/106, 102; 546/14; 524/99, 269

[56] References Cited

U.S. PATENT DOCUMENTS

| | | | |
|---|---|---|---|
| 4,110,185 | 8/1978 | Williams et al. | 204/159.2 |
| 4,274,932 | 6/1981 | Williams et al. | 204/159.2 |
| 4,467,061 | 8/1984 | Yamamoto et al. | 524/87 |
| 4,563,259 | 1/1986 | Rayner | 524/99 |
| 4,710,524 | 12/1987 | Donohue | 522/75 |
| 4,749,734 | 6/1988 | Williams et al. | 524/102 |
| 4,785,034 | 11/1988 | Gaku et al. | 524/99 |
| 4,797,438 | 1/1989 | Kletecka et al. | 524/100 |
| 4,888,369 | 12/1989 | Moore, Jr. | 524/100 |
| 4,972,009 | 11/1990 | Suhadolnik et al. | 524/99 |
| 4,985,479 | 1/1991 | Nagasaki et al. | 524/96 |
| 5,001,205 | 3/1991 | Hoel | 526/128 |
| 5,324,880 | 6/1994 | Dyroff | 585/660 |
| 5,362,782 | 11/1994 | McCullough et al. | 524/108 |
| 5,371,124 | 12/1994 | Cooke | 524/99 |
| 5,491,207 | 2/1996 | Hoel | 526/129 |

FOREIGN PATENT DOCUMENTS

| | | |
|---|---|---|
| 664315 | 7/1995 | European Pat. Off. . |
| 343717 | 11/1989 | Germany . |
| 4216923 | 11/1993 | Germany . |

OTHER PUBLICATIONS

English Translation of Japanese Patent Application No. Hei–4–142354 (1992).
"Testing Methods for Optical Properties of Plastic" JIS K 7105 pp. 294–325.
Uvasil 299 brochure (undated).

*Primary Examiner*—Ralph H. Dean

[57] ABSTRACT

An embrittlement-resistant polymer composition, including: (a) a visbroken polymer composition comprising a crystalline, random copolymer of propylene and either ethylene or $C_4$–$C_{10}$ 1-olefins, and (b) an amount of polymethyl propyl 3-oxy-[4-(2,2,6,6-tetramethyl)piperidinyl] siloxane which is effective to improve the radiation resistance of the composition. Optional components include an acid neutralizing agent, and a sorbitol-based clarifier compound. The composition may be used to manufacture medical articles and food packaging material which must be sterilized, either by irradiation or by autoclaving.

9 Claims, 6 Drawing Sheets

Flange Bend Test - Angle of Break
(3.5 Mrads Exposure)

Flange Bend Test - Angle of Break
(5.0 Mrads Exposure)

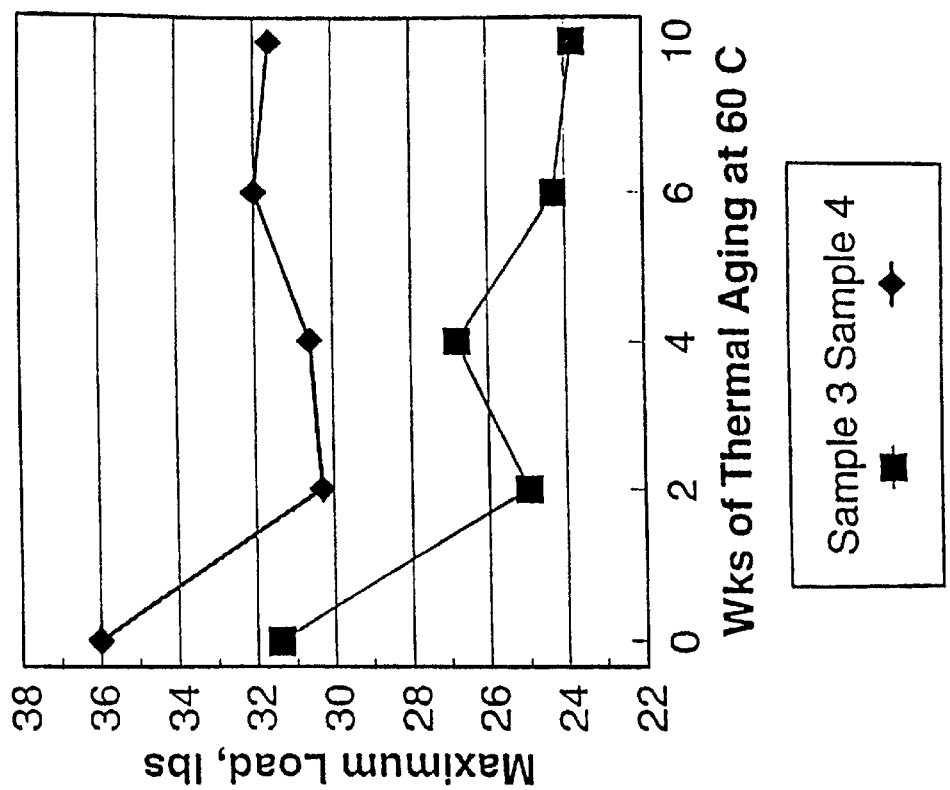
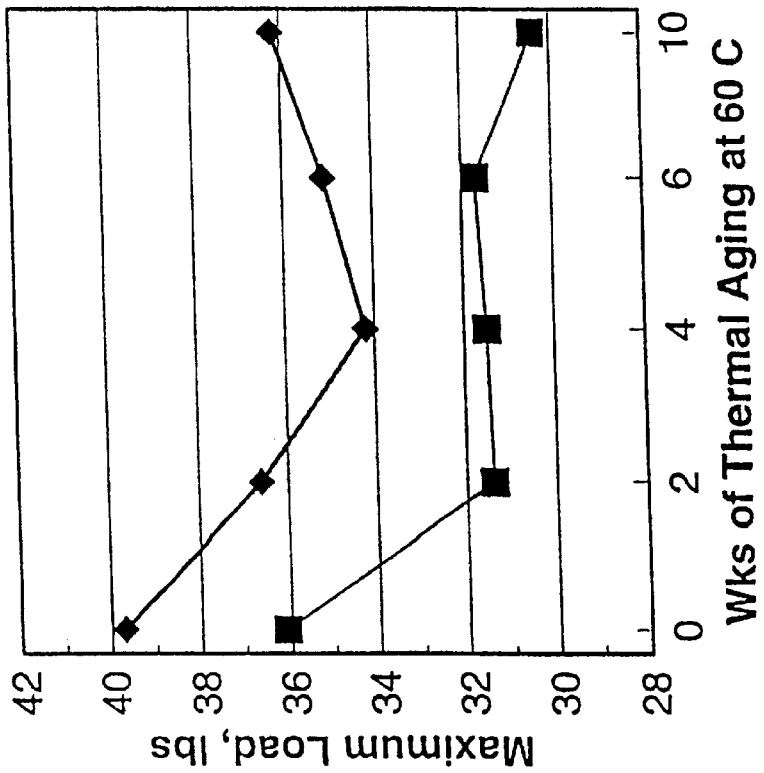

Flange Bend Test - Toughness at Max. Load
(3.5 Mrads Exposure)

Flange Bend Test - Toughness at Max. Load
(5.0 Mrads Exposure)

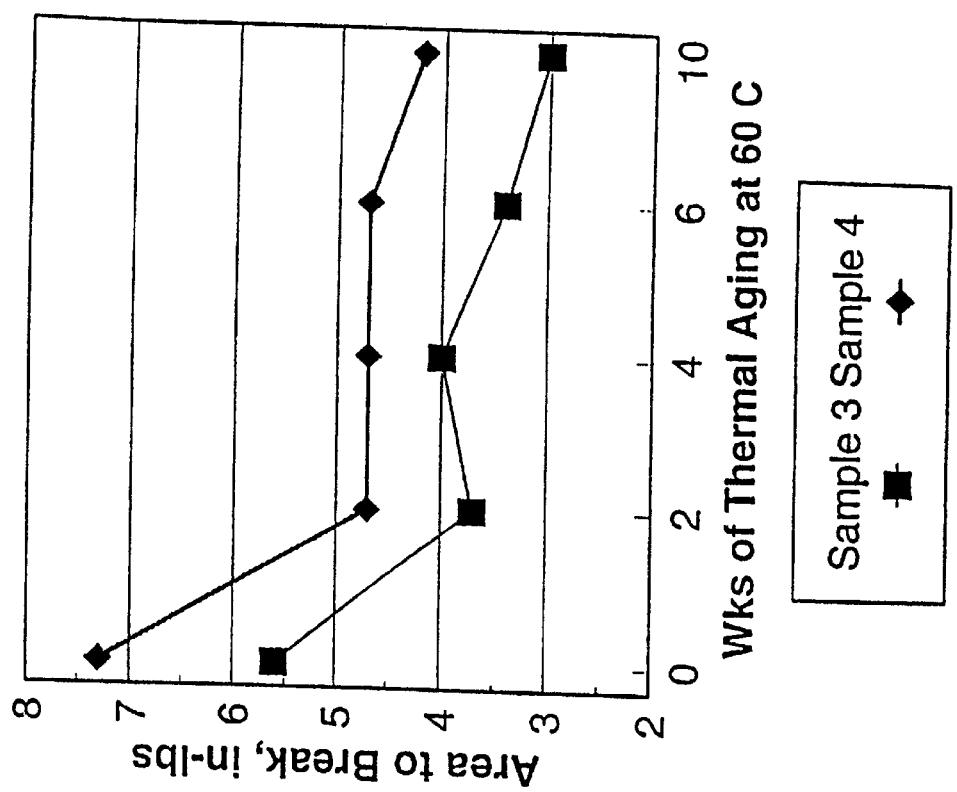
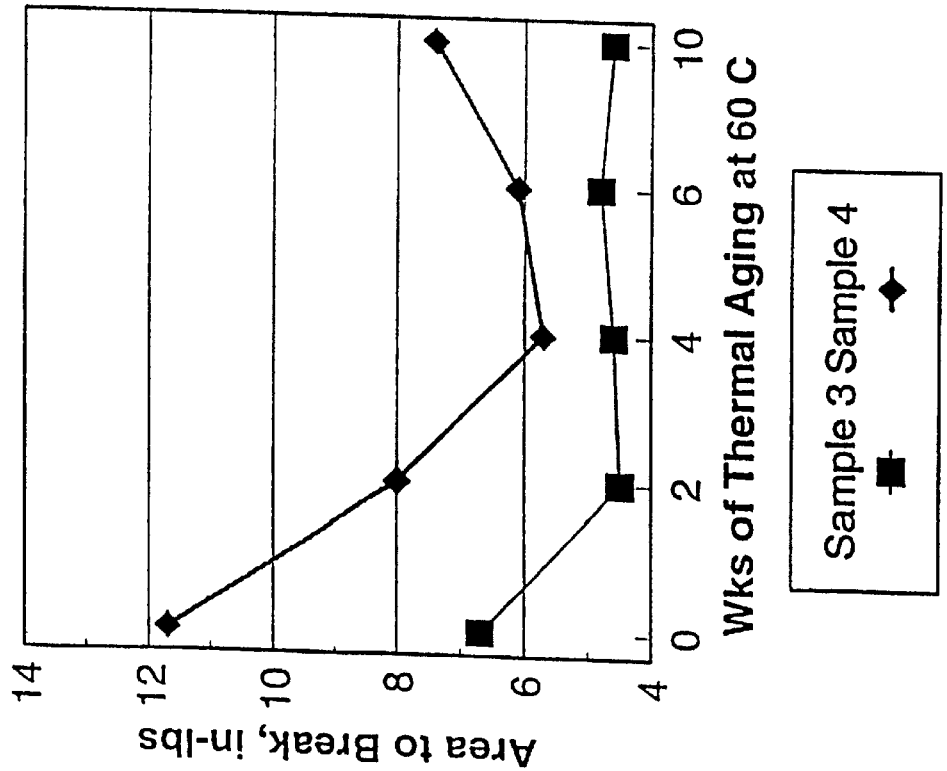

Barrel Crush Test - Displacement to Max. Load
(5.0 Mrads Exposure)

Barrel Crush Test - Displacement at Max. Load
(3.5 Mrads Exposure)

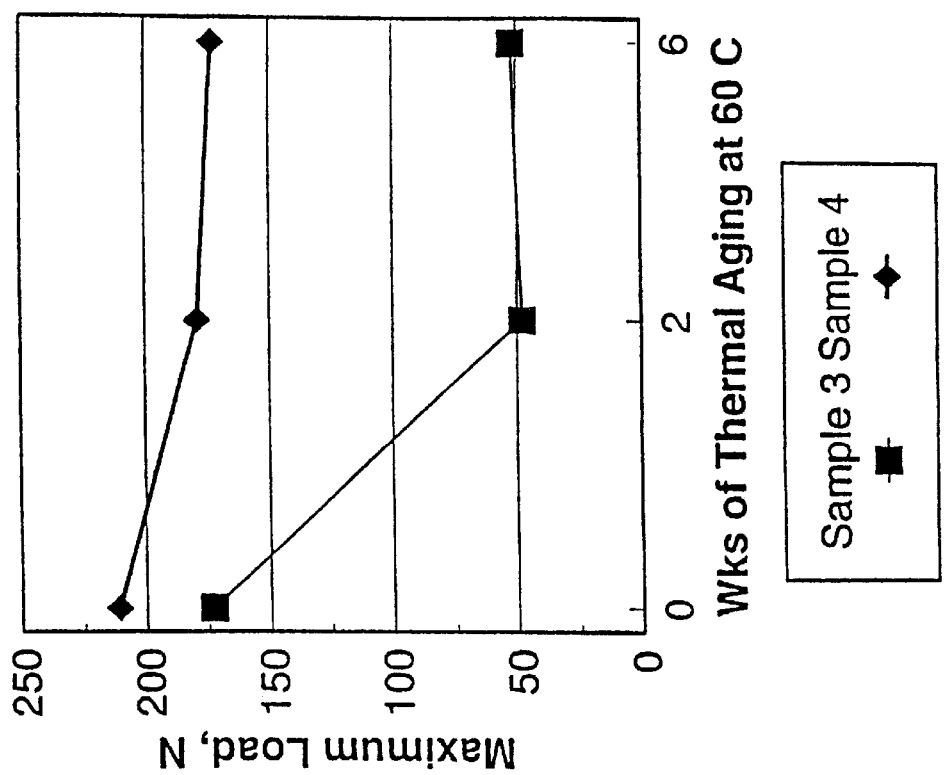
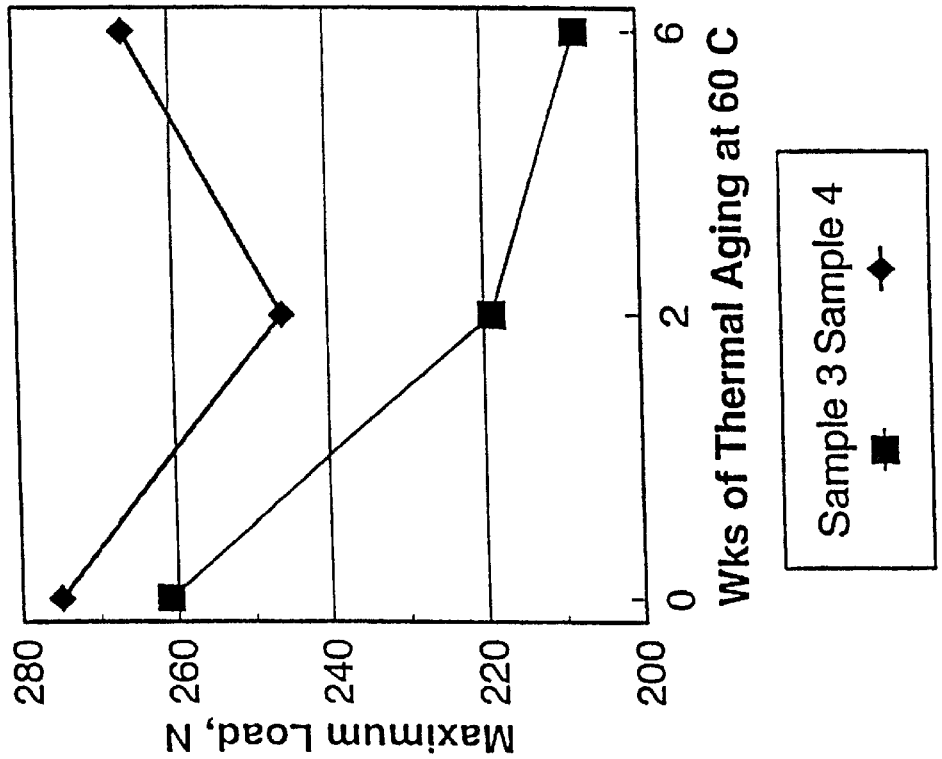

EMBRITTLEMENT-RESISTANT POLYOLEFIN COMPOSITION AND FLEXIBLE ARTICLES THEREFROM

FIELD OF THE INVENTION

The present invention relates to a substantially transparent, embrittlement-resistant polyolefin composition and to flexible, sterilizable articles produced therefrom.

BACKGROUND OF THE INVENTION

Various articles made of polyolefins must be sterilized, either by radiation or by autoclaving. For example, it is known to sterilize articles such as syringe barrels and plungers, tubing and tube assemblies, forceps, surgical clamps, packaging film, tissue culture tubes, fibers for surgical gowns and sheets with high energy radiation. A radiation dosage of 1.5 to 5.0 megarads is usually sufficient to effectively sterilize such shaped articles and the material contained therein. However, polymeric articles exposed to such radiation typically suffer from discoloration and embrittlement, which can render them unfit for their intended use.

The prior art has sought to inhibit such radiation-induced discoloration and/or embrittlement by incorporating various additives to the polymeric composition prior to molding or shaping of the polymer into a useful article. Thus, for example, U.S. Pat. No. 4,110,185 describes incorporating a low molecular weight, preferably not highly viscous, liquid mobilizer, such as a hydrocarbon oil, into a semi-crystalline polypropylene to increase the free volume of the polymer and allow it to retain its flexibility after irradiation. U.S. Pat. No. 4,274,932 describes incorporating the mobilizer in a semi-crystalline polypropylene which has been visbroken to narrow its molecular weight distribution. See also U.S. Pat. No. 4,474,734. The use of such mobilizers is now the state of the art in commercially available propylene polymer compositions.

U.S. Pat. No. 5,371,124 to Cooke provides a good summary of the various additives which have been proposed to enhance the radiation resistance of propylene polymer compositions. See also U.S. Pat. No. 4,888,369 to Moore, Jr. However, any additive must be compatible with the other components of the polymer composition, and may cause other problems, including objectionable odor and/or color, processing difficulties, bleeding of the additive from the article over time, etc. See, for example, U.S. Pat. No. 4,710,524, which suggests that the inclusion of a mobilizing additive as described in U.S. Pat. Nos. 4,110,185 and 4,274,932 produces undesirable handling and imprinting problems.

In addition, an oil mobilizer generally results in a concomitant loss of clarity of the polymer product produced from such compositions. Flexural modulus and stiffness are also reduced when parts produced from such polymer products are subjected to autoclave sterilization over time.

Syringe grade material made from polypropylene typically must be peroxide visbroken from a low melt flow rate (MFR) to obtain a narrow molecular weight distribution and must contain oil as a mobilizer to improve the free radical scavenging ability of a hindered amine light stabilizer additive. The polypropylene material typically also contains a sorbitol-based additive as a nucleator.

An object of the present invention is to provide an embrittlement-resistant polymer composition which does not require the incorporation of a mobilizing oil additive to impart radiation resistance.

Another object of the present invention is to provide an embrittlement-resistant polymer composition which can be injection molded into flexible, substantially transparent articles.

BRIEF SUMMARY OF THE INVENTION

In one aspect, the present invention relates to an embrittlement-resistant, transparent polyolefin composition, consisting essentially of:

(a) a visbroken propylene polymer composition comprising a crystalline, random copolymer of propylene and either ethylene or $C_4$–$C_{10}$ 1-olefins, (b) an amount of polymethyl propyl 3-oxy-[4-(2,2,6,6-tetramethyl)piperidinyl] siloxane which is effective to improve the radiation resistance of the composition.

The present invention also provides a sterilizable article in which at least part of the material construction thereof consists essentially of the radiation resistant composition of this invention.

In another embodiment, this invention provides a sterilized article made by converting the composition of this invention into an useful article and then subjecting the article to high energy radiation or autoclaving to sterilize the article.

BRIEF DESCRIPTION OF THE DRAWINGS

FIG. 3 depicts a graph of maximum load of syringe samples subjected to a flange bend test which had been exposed to 3.5 Mrad cobalt 60 gamma radiation and maintained at 60° C. over a period of 10 weeks.

FIG. 4 depicts a graph of maximum load of syringe samples subjected to a flange bend test which had been exposed to 5.0 Mrad cobalt 60 gamma radiation and maintained at 60° C. over a period of 10 weeks.

FIG. 7 depicts a graph of area to break of syringe samples subjected to a flange bend test which had been exposed to 3.5 Mrad cobalt 60 gamma radiation and maintained at 60° C. over a period of 10 weeks.

FIG. 8 depicts a graph of area to break of syringe samples subjected to a flange bend test which had been exposed to 5.0 Mrad cobalt 60 gamma radiation and maintained at 60° C. over a period of 10 weeks.

FIG. 11 depicts a graph of maximum load of syringe samples subjected to a barrel crush test which had been exposed to 3.5 Mrad cobalt 60 gamma radiation and maintained at 60° C. over a period of 6 weeks.

FIG. 12 depicts a graph of maximum load of syringe samples subjected to a barrel crush test which had been exposed to 5.0 Mrad cobalt 60 gamma radiation and maintained at 60° C. over a period of 6 weeks.

In FIGS. 1–12, Sample 3 is a syringe prepared from the composition of Comparative Example 1 and Sample 4 is a syringe prepared from the composition of Example 1.

DETAILED DESCRIPTION OF THE PREFERRED EMBODIMENTS

Figure 1:
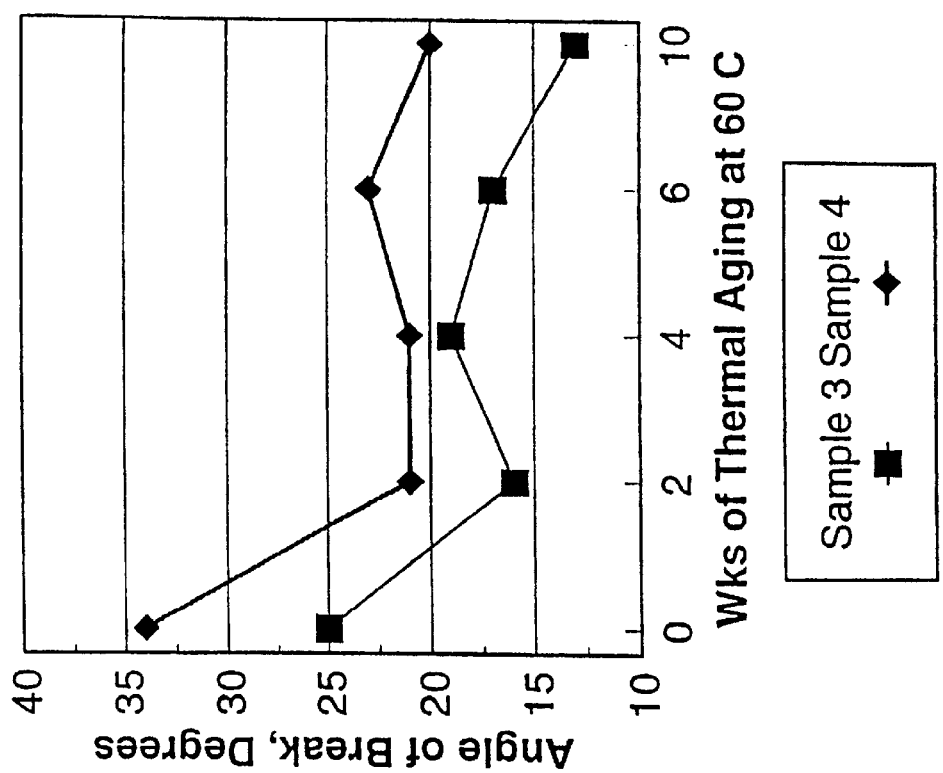
FIG. 1 depicts a graph of angle of break of syringe samples subjected to a flange bend test which had been exposed to 3.5 Mrad cobalt 60 gamma radiation and maintained at 60° C. over a period of 10 weeks.

The Applicant has unexpectedly discovered that an embrittlement-resistant, transparent polymer composition which does not require the incorporation of an additional mobilizing additive to impart radiation resistance can be provided if a specific hindered amine light stabilizer is employed. Moreover, injection molded articles prepared from the Applicant's composition exhibit surprising resistance to long term embrittlement after being subjected to sterilization by radiation techniques in comparison to similar polyolefin compositions stabilized with other hindered amine light stabilizers.

The propylene polymer material may be a crystalline, random copolymer of propylene and an olefin selected from the group consisting of ethylene, and $C_4$–$C_{10}$ 1-olefins, provided that, when the olefin is ethylene, the maximum polymerized ethylene content is about 10, preferably about 4, percent by weight, and, when the olefin is a $C_4$–$C_{10}$ 1-olefin, the maximum polymerized content thereof is about 20, preferably about 16, percent by weight. The crystalline random copolymer typically has a propylene content of at least 95% by weight where ethylene is the comonomer.

The $C_4$–$C_{10}$ 1-olefins include the linear and branched $C_4$–$C_{10}$ 1-olefins such as, for example, 1-butene, 1-pentene, 3-methyl-1-butene, 4-methyl-1-pentene, 1-hexene, 3,4-dimethyl-1-butene, 1-heptene, 3-methyl-1-hexene, and the like. 1-Butene is preferred.

The process of visbreaking a propylene polymer material is well known to those skilled in the art. Generally, it is carried out as follows: propylene polymer in particulate form, e.g., "as polymerized" flake or pelletized, has sprayed thereon or blended therewith, a prodegradant or free radical generating source, e.g., a peroxide in liquid or powder form or absorbed on and/or in a carrier, e.g., polypropylene (Xantrix 3024 peroxide concentrate, manufactured by Montell U.S.A., Inc). The propylene polymer and peroxide or propylene polymer/peroxide concentrate is then introduced into a means for thermally plasticizing or melt blending and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the propylene polymer as well as to reduce the overall molecular weight and thereby increase the MFR relative to the as-polymerized propylene polymer. For example, a propylene polymer with a fractional MFR (i.e., less than 1), or a propylene polymer with a MFR of 0.5–10, can be selectively visbroken to a MFR of 15–50, preferably 27–42, by selection of peroxide type, extruder temperature and extruder residence time without undue experimentation. Sufficient care should be exercised in the practice of the procedure to avoid crosslinking in the presence of an ethylene-containing copolymer; typically, crosslinking will be avoided where the ethylene content of the copolymer is sufficiently low.

The crystalline propylene polymer and various additives discussed below may be melt blended together by using conventional extrusion or mixing equipment such as a single screw extruder, twin-screw extruder, Banbury mixer, Brabender mixer, etc. Preferably, an as-polymerized (i.e. as produced by the polymerization reaction) composition is melt blended with the additive(s).

The radiation resistant composition of this invention includes polymethyl propyl 3-oxy-[4-(2,2,6,6-tetramethyl) piperidinyl] siloxane as a hindered heterocyclic amine light stabilizer (HALS) with a siloxane functionality. This non-traditional HALS compound is commercially available from the Great Lakes Chemical Corporation under the trademark Uvasil 299 for use as a UV light stabilizer.

The HALS compound is typically present in an amount of about 0.01 to 3.0 pph, preferably 0.05 to 1.0 pph and most preferably 0.10 to 0.2 pph. More than 3.0 pph of the HALS compound is generally not needed, although greater than 3.0 pph is within the broadest aspects of the invention.

The embrittlement-resistant composition of this invention may include at least one acid neutralizing agent, which may be selected from the group consisting of metal soaps, hydrotalcites, aluminum silicate, zinc oxide, and calcium oxides and hydroxides of Group II metals. Hydrotalcite is commercially available from Kyowa Chemical Industry Co., Ltd., Osaka, Japan under the product designation DHT-4A.

The acid neutralizing agent is typically present in an amount of 0.01 to 1, preferably 0.05 to 0.1 weight percent, based on the total weight of the composition.

The embrittlement-resistant composition of this invention may include at least one sorbitol-based compound as a clarifier, which may be selected from the group consisting of bis-(3,5-dimethyl-benzylidene) sorbitol; (1,3)2,4-di(p-methyl benzylidene) sorbitol; (1,3)2,4-di(p-chlorobenzylidene) sorbitol; and (1,3)2,4-di(p-methoxybenzylidene) sorbitol. Bis-(3,5-dimethylbenzylidene) sorbitol is a preferred sorbitol-based compound, and is commercially available from Milliken and Co. under the trademark Millad 3988.

The sorbitol-based compound is typically present in an amount of 0.01 to 4, preferably 0.1 to 0.25 weight percent, based on the total weight of the composition.

Small amounts of other additives such as antioxidants and/or light stabilizers may be present in the propylene polymer composition. These include phenolic antioxidants of the kind used in polyolefins, e.g., tetrakis[methylene 3-3',5'-di-tert-butyl-4'-hydroxyphenyl) propionate] methane, which may be present in an amount less than 150 ppm. Heat and antioxidant stabilizing phosphites, e.g., tris-(2,4-di-tert-butylphenyl) phosphite, may be present in an amount of from 0.1 to 1 weight percent. Other additives such as fillers and colorants also can be present.

A major advantage of the embrittlement-resistant composition of the present invention does not contain conventional mobilizing oils such as those disclosed in U.S. Pat. No. 4,749,734 to Williams et al.

The embrittlement-resistant composition of this invention may be made into various articles of manufacture possessing good flexibility. Typical useful articles include syringes barrels and plungers, tubing and tube assemblies, forceps, surgical clamps, packaging film, tissue culture tubes, fibers for surgical gowns, sheets and the like. Conventional manufacturing methods, such as molding, including injection molding, compression molding, extrusion molding, or vacuum molding; extrusion; extrusion casting; spun-bonding; melt blowing; etc, may be used to produce the articles.

The embrittlement-resistant articles may be sterilized using conventional techniques and apparatus well known to those of ordinary skill. A radiation dosage of 2.5 to 5.0 megarads is sufficient to effectively sterilize shaped articles and the material contained therein and is the industry standard. However, radiation dosages up to about 5.0 megarads can be applied even though dosages in excess of 2.5 megarads are not necessary to accomplish the sterilization. Alternatively, conventional autoclaving techniques and apparatus can be employed to sterilize the articles.

EXAMPLES

The following Examples describe preferred embodiments of the embrittlement-resistant propylene polymer composition and sterilizable article of the invention, and are presented for illustrative purposes only.

Unless otherwise specified, all quantities of ingredients are in pph of the propylene polymer material except, of course, for the propylene polymer material.

Example 1

This Example illustrates the propylene polymer composition of this invention and the preparation thereof. 100 grams of a random copolymer of propylene and ethylene (3.4 wt.% ethylene) in flake form having a nominal melt flow rate of 2.0 dg/minute and visbroken with Lupersol 101 peroxide to a melt flow rate of 27 dg/minute were mixed with Uvasil 299 polymethyl propyl 3-oxy-[4-(2,2,6,6-tetramethyl)piperidinyl] siloxane, a hindered amine light stabilizer, in an amount of 0.12 part per 100 parts by weight polymer, 0.18 part of Millad 3988 dibenzylidene sorbitol per 100 parts by weight polymer, and 0.05 part of DHT-4A hydrotalcite per 100 parts by weight of polymer.

The ingredients, which were in finely divided condition, were tumble blended until a homogeneous mixture is obtained (approximately 1 minute). The mixture was then extruded at 475° F. and 100 rpm in a Davis Standard vacuum vented, tapered, counter-rotating, intermeshing twin screw extruder. The resulting blend was extruded as a strand, cooled in water, and pelletized.

Comparative Example 1

This Comparative Example illustrates the use of a HALS commonly used in commercial embrittlement-resistant propylene polymer formulations together with a mobilizer compound. The ingredients of Example 1 were used except that Tinuvin 622 poly-(N-B-hydroxyethyl-2,2,6,6-tetramethyl-4-hydroxy-piperidylsuccinate), hindered amine light stabilizer, commercially available from Ciba-Geigy, was used in an amount of 0.12 part per 100 parts by weight polymer, instead of the Uvasil 299 hindered amine light stabilizer.

Example 2

The pellets prepared in Example 1 and Comparative Example 1 were manufactured into syringes using conventional injection molding techniques and apparatus. Syringes prepared from the sample formulations (Sample 4 was prepared using the composition of Example 1 and Sample 3 was prepared using the composition of Comparative Example 1) were exposed to cobalt 60 gamma radiation at a dose levels of 3.5 or 5.0 MRad using conventional techniques and apparatus.

Figure 2:
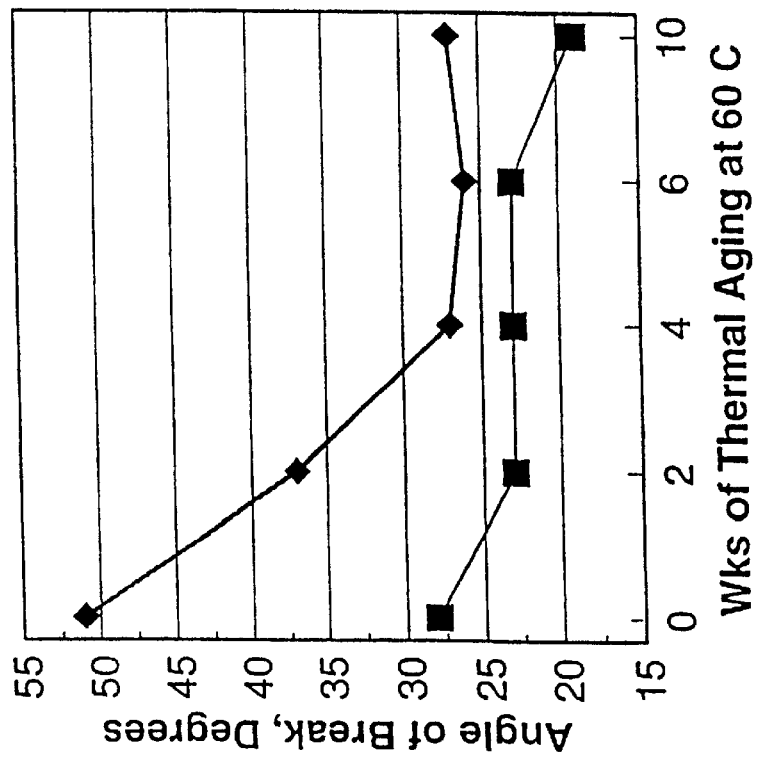
FIG. 2 depicts a graph of angle of break of syringe samples subjected to a flange bend test which had been exposed to 5.0 Mrad cobalt 60 gamma radiation and maintained at 60° C. over a period of 10 weeks.
Figure 5:
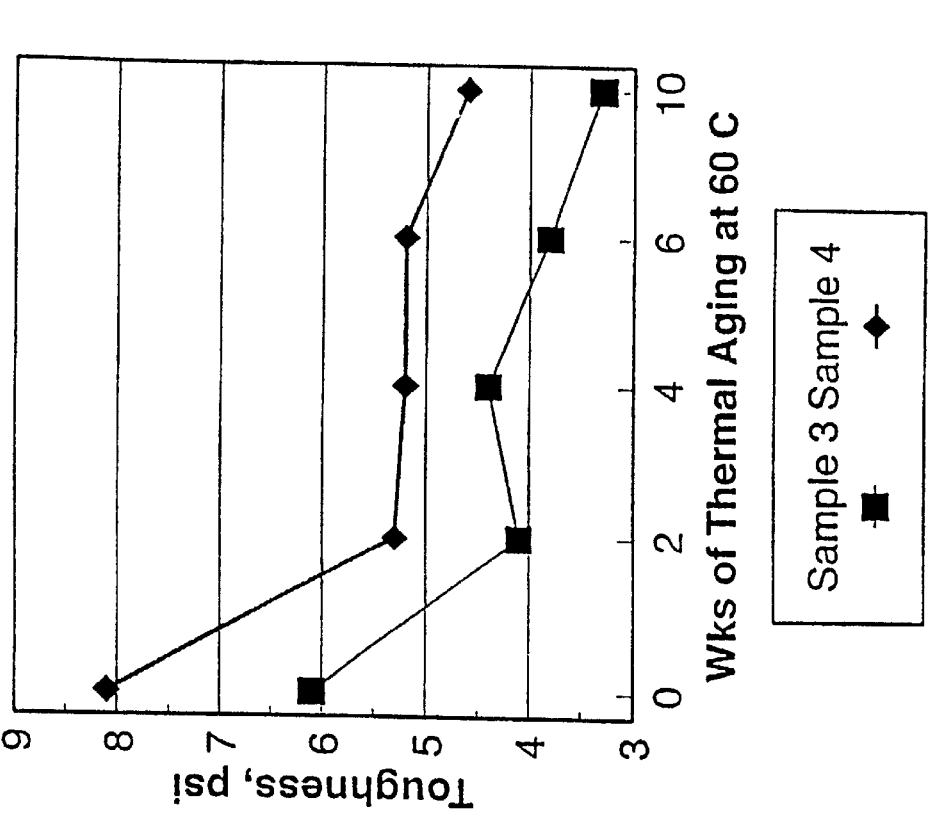
FIG. 5 depicts a graph of toughness at maximum load of syringe samples subjected to a flange bend test which had been exposed to 3.5 Mrad cobalt 60 gamma radiation and maintained at 60° C. over a period of 10 weeks.
Figure 6:
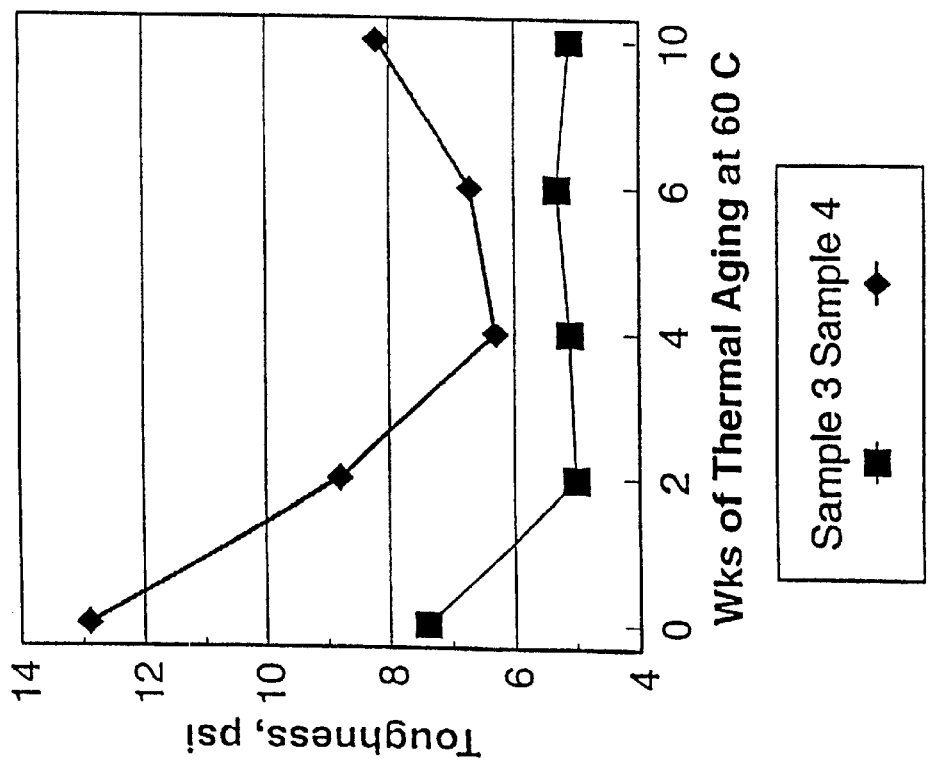
FIG. 6 depicts a graph of toughness at maximum load of syringe samples subjected to a flange bend test which had been exposed to 5.0 Mrad cobalt 60 gamma radiation and maintained at 60° C. over a period of 10 weeks.
Figure 10:
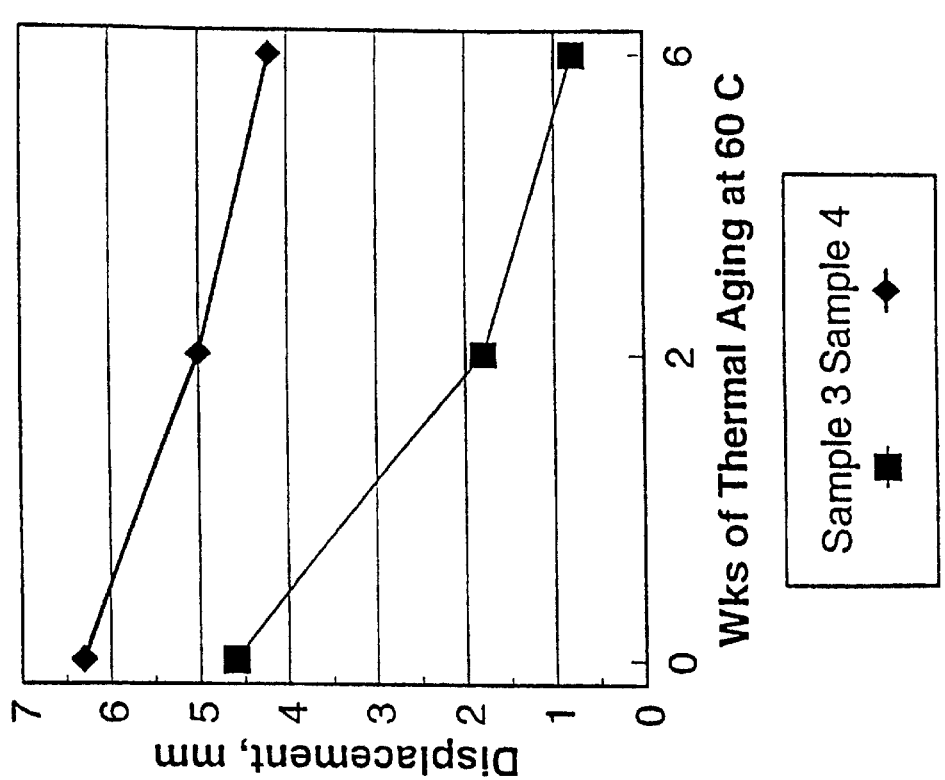
FIG. 10 depicts a graph of displacement of syringe samples subjected to a barrel crush test which had been exposed to 5.0 Mrad cobalt 60 gamma radiation and maintained at 60° C. over a period of 6 weeks.
Figure 9:
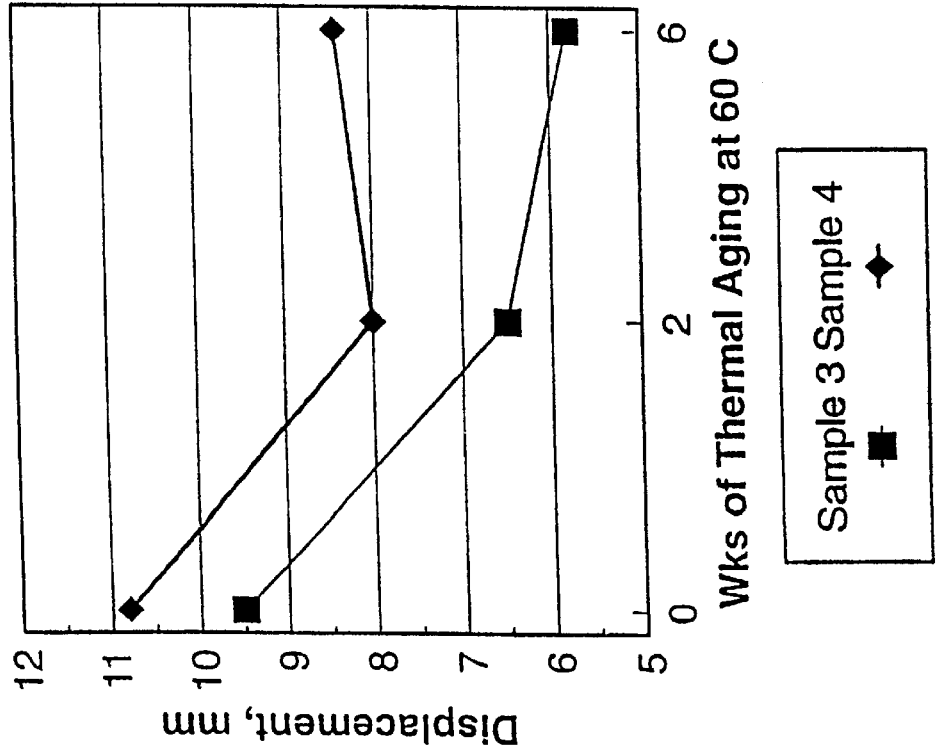
FIG. 9 depicts a graph of displacement of syringe samples 10 subjected to a barrel crush test which had been exposed to 3.5 Mrad cobalt 60 gamma radiation and maintained at 60° C. over a period of 6 weeks.

The syringes were then tested for flexibility by subjecting them to flange bend testing and barrel crush testing. FIGS. 1–12 graphically demonstrate the superior flexibility of the inventive composition over a similar composition which employs a different, commonly-used hindered amine light stabilizer. The inventive composition outperforms the comparative composition by all measurement techniques and at all radiation levels.

An advantage of the present invention is that the polymer composition does not require the incorporation of an additional additive such as a mobilizing oil to impart radiation resistance. Another advantage is that the polymer composition can be manufactured into flexible, transparent articles which can be sterilized either by autoclaving or by radiation. Still another advantage is that the polymer composition of this invention resists embrittlement over time.

I claim:

1. An embrittlement-resistant propylene polymer composition, consisting essentially of:

(a) a visbroken propylene polymer comprising a crystalline, random copolymer of propylene and either ethylene or $C_4$–$C_{10}$ 1-olefins, (b) an amount of polymethyl propyl 3-oxy-[4-(2,2,6,6-tetramethyl)piperidinyl] siloxane which is effective to improve the gamma radiation resistance of the composition, and (c) a sorbitol-based compound.

2. The polymer composition of claim 1, further consisting essentially of at least one acid neutralizing agent selected from the group consisting of metal soaps, hydrotalcites, aluminum silicate, zinc oxides and calcium oxides and hydroxides of Group II metals.

3. The polymer composition of claim 1, wherein said sorbitol-based compound is at least one member selected from the group consisting of bis-(3,5-dimethylbenzylidene) sorbitol; (1,3)2,4-di(p-methylbenzylidene) sorbitol; (1,3)2,4-di(p-chlorobenzylidene) sorbitol; and (1,3)2,4-di(p-methoxybenzylidene) sorbitol.

4. The polymer composition of claim 1, wherein (b) is present an amount from 0.01 to 3.0 pph.

5. The polymer composition of claim 2, wherein (b) is present an amount from 0.01 to 3.0 pph.

6. The polymer composition of claim 3, wherein (b) is present an amount from 0.01 to 3.0 pph.

7. A sterilizable article in which at least part of the material construction thereof comprises the polymer composition of claim 1.

8. The sterilizable article of claim 7, wherein said article is selected from the group consisting of syringe barrels, syringe plungers, tubing, tube assemblies, forceps, surgical clamps, tissue culture tubes, and fibers for surgical gowns.

9. A sterilized article in which at least part of the material construction thereof comprises the polymer composition of claim 1.

* * * * *